US008155661B2

(12) United States Patent
Gerlach

(10) Patent No.: US 8,155,661 B2
(45) Date of Patent: Apr. 10, 2012

(54) METHOD FOR AUTOMATIC RESOURCE RESTRICTION DISTRIBUTION, A BASE STATION, A MOBILE TERMINAL, A RESOURCE DISTRIBUTION DEVICE AND A MOBILE NETWORK THEREFOR

(75) Inventor: Christian Georg Gerlach, Ditzingen (DE)

(73) Assignee: Alcatel Lucent, Paris (FR)

( * ) Notice: Subject to any disclaimer, the term of this patent is extended or adjusted under 35 U.S.C. 154(b) by 1304 days.

(21) Appl. No.: 11/592,311

(22) Filed: Nov. 3, 2006

(65) Prior Publication Data
US 2007/0105583 A1 May 10, 2007

(30) Foreign Application Priority Data

Nov. 4, 2005 (EP) .................................... 05292335

(51) Int. Cl.
*H04W 72/00* (2009.01)
(52) U.S. Cl. .................... 455/453; 455/63.2; 455/452.2; 455/560
(58) Field of Classification Search ........................ None
See application file for complete search history.

(56) References Cited

U.S. PATENT DOCUMENTS

| 6,078,815 | A | 6/2000 | Edwards | |
|---|---|---|---|---|
| 7,363,039 | B2* | 4/2008 | Laroia et al. | 455/448 |
| 7,426,395 | B2* | 9/2008 | Stephens | 455/452.2 |
| 2004/0185905 | A1* | 9/2004 | Tanoue | 455/560 |
| 2005/0105589 | A1* | 5/2005 | Sung et al. | 375/130 |
| 2005/0197147 | A1 | 9/2005 | Stephens | |
| 2006/0276191 | A1* | 12/2006 | Hwang et al. | 455/436 |
| 2007/0060062 | A1* | 3/2007 | Wengerter et al. | 455/63.2 |
| 2008/0260000 | A1* | 10/2008 | Periyalwar et al. | 375/133 |

FOREIGN PATENT DOCUMENTS

WO    WO 2004/019538 A    3/2004

* cited by examiner

*Primary Examiner* — Rafael Pérez-Gutiérrez
*Assistant Examiner* — Daniel Nobile
(74) *Attorney, Agent, or Firm* — Fay Sharpe LLP

(57) ABSTRACT

The invention concerns a method for automatic resource restriction distribution for coordination of the interference between cells (C1, C2, . . . ) or sectors (S1, S2, . . . ) of a single frequency network with the frequency band being subdivided into at least two subsets (F1, F2 . . . FR), whereby mobile terminals (T1) in the single frequency network perform power measurements of pilot symbols, based on said power measurements, the signal to interference ratio and the data throughput in the cells (C1, C2, . . . ) in case of no interference coordination and in case of interference coordination is calculated, and at least one dedicated subset of said at least two subsets (F1, F2 . . . FR) is chosen for usage with restricted power in such a way that the overall data throughput in the cells (C1, C2, . . . ) is maximized, a base station, a mobile terminal, a resource distribution device and a mobile network therefor.

18 Claims, 6 Drawing Sheets

METHOD FOR AUTOMATIC RESOURCE RESTRICTION DISTRIBUTION, A BASE STATION, A MOBILE TERMINAL, A RESOURCE DISTRIBUTION DEVICE AND A MOBILE NETWORK THEREFOR

BACKGROUND OF THE INVENTION

The invention is based on a priority application EP05292335.6 which is hereby incorporated by reference.

The invention relates to a method for automatic resource restriction distribution for coordination of the interference in a single frequency network whereby at least one of said at least two subsets (F1, F2 . . . FR) is intended for usage with restricted power in at least one cell or sector, characterized in, that mobile terminals (T1) in the single frequency network perform power or reception strength measurements of pilot symbols of their serving cells and of neighbor cells over a representative time interval, based on said power or strength measurements, the signal to interference ratios for the terminals in the cells (C1, C2, . . . ) in case of no interference coordination and in case of interference coordination leading to removal of the strongest interferer is calculated, by means of the signal to interference ratios, the data throughput in case of no interference coordination and in case of interference coordination is calculated and at least one dedicated subset of said at least two subsets (F1, F2 . . . FR) is chosen for usage with restricted power in at least one dedicated cell (C1) or sector (S1) in such a way that the overall data throughput in the cells (C1, C2, . . . ) is maximized, a base station whereby at least one of said at least two subsets (F1, F2 . . . FR) is intended for usage with restricted power in at least one cell or sector, wherein the base station comprises means for calculating the signal to interference ratios for the terminals in the cells (C1, C2, . . . ) or sectors (S1, S2, . . . ) in case of no interference coordination and in case of interference coordination leading to removal of the strongest interferer based on power or strength measurements of pilot symbols performed by mobile terminals measuring the pilot symbols of their serving cells and of neighbor cells, and the base station comprises means for sending the signal to interference ratio or a deduced value to another network device, a mobile terminal whereby at least one of said at least two subsets (F1, F2 . . . FR) is intended for usage with restricted power in at least one cell (C1) or sector (S1), wherein the mobile terminal comprises means for performing power or strength measurements of pilot symbols of its serving cell and of neighbor cells over a representative time interval, the mobile terminal comprises means for calculating the signal to interference ratio in case of no interference coordination and in case of interference coordination leading to removal of the strongest interferer based on said power or strength measurements, and the mobile terminal comprises means for sending the signal to interference ratios to a base station, a resource distribution device whereby at least one of said at least two subsets (F1, F2 . . . FR) is intended for usage with restricted power in at least one cell (C1) or sector (S1), wherein the resource distribution device comprises means for calculating the mean data throughput in case of no interference coordination and in case of interference coordination leading to removal of the strongest interferer based on difference in resource restrictions in neighboring cells or sectors by means of the signal to interference ratios in the cells measured by mobile terminals (T1), and the resource distribution device comprises means for choosing at least one dedicated subset of said at least two subsets (F1, F2 . . . FR) for usage with restricted power in at least one dedicated cell (C1) or sectors (S1) in such a way that the overall data throughput in the cells (C1, C2, . . . ) is improved or is maximized and a mobile network.

Orthogonal transmission schemes such as Orthogonal Frequency Division Multiplexing (OFDM), single carrier Frequency Division Multiple Access (FDMA) or distributed FDMA such as interleaved FDMA with multiple terminals will become increasingly important e.g. for future evolutions of air interfaces for mobile radio systems. Those radio systems are currently under discussion e.g. in Third Generation Partnership Project (3GPP) Technical Specification Group (TSG) Radio Access Network (RAN), for Wireless Local Area Networks (WLANs) e.g. according to standard IEEE 802.11a, or for a $4^{th}$ generation air interface.

Given the licensed bandwidth, transmission capacity from network providers e.g. for picture uploading or video communication has to be as high as possible for all users to serve as many subscribers as possible. Further the quality of service experienced by the user and especially the coverage of the service is an important property demanded by the user. So an access scheme shall work well at the cell borders of a single frequency network (SFN). For that reason, interference coordination schemes are based on a distribution of resources across cells in a kind of network planning. This distribution of resources comprises the distribution of restrictions of the transmission power in the cells on restricted subsets of the group of subsets the frequency band is subdivided into.

In a multi-cell area the restrictions have to be distributed so that in the region between two cells always different restriction settings meet and in the whole border region as much as possible of the spectrum can be used and the data throughput is thus maximized.

So the goal of the distribution of restrictions is that neighboring cells or sectors have different restrictions and the corresponding possible preferences, as e.g. the preferably used subsets, for mobile terminals in the border region possibly leaving the cell are distributed across different parts of the border region.

This distribution of restrictions has to be reconsidered or revised if a new cell is added to an existing network or if an existing cell is removed.

In practice networks have to be adapted to a real geography and limited availability of geographic locations where base stations can be placed. So the base station pattern will not be regular anymore. Thus a network planning for the restrictions or preferences has to be done for such real and irregularly positioned base stations. In the international patent application WO2004/019538 A2, there is a method disclosed for assigning wireless terminals to channels, whereby different channels in a cell are assigned different power levels. The wireless terminals are assigned to channels based on channel feedback information in such a way, that wireless terminals with poor channel conditions are allocated to higher power channels than wireless terminals with good channel conditions. Further if a new base station is added in an area where other base stations are already placed, the task is to distribute or redistribute the restrictions.

SUMMARY OF THE INVENTION

The object of the invention is to propose a method for automatic resource restriction distribution for coordination of the interference between cells or sectors of a single frequency network offering a good usage of the available resources.

This object is achieved by a method according to the teaching, whereby at least one of said at least two subsets (F1 F2 ... FR) is intended for usage with restricted power in at least one cell or sector, characterized in, that
mobile terminals (T1) in the single frequency network perform power or reception strength measurements of pilot symbols of their serving cells and of neighbor cells over a representative time interval,
based on said power or strength measurements, the signal to interference ratios for the terminals in the cells (C1, C2, ...) in case of no interference coordination and in case of interference coordination leading to removal of the strongest interferer is calculated,
by means of the signal to interference ratios, the data throughput in case of no interference coordination and in case of interference coordination is calculated
and at least one dedicated subset of said at least two subsets (F1, F2 ... FR) is chosen for usage with restricted power in at least one dedicated cell (C1) or sector (S1) in such a way that the overall data throughput in the cells (C1, C2, ...) is maximized,
a base station whereby at least one of said at least two subsets (F1, F2 ... FR) is intended for usage with restricted power in at least one cell or sector, wherein
the base station comprises means for calculating the signal to interference ratios for the terminals in the cells (C1, C2, ...) or sectors (S1, S2, ...) in case of no interference coordination and in case of interference coordination leading to removal of the strongest interferer based on power or strength measurements of pilot symbols performed by mobile terminals measuring the pilot symbols of their serving cells and of neighbor cells,
and the base station comprises means for sending the signal to interference ratio or a deduced value to another network device,
a mobile terminal whereby at least one of said at least two subsets (F1, F2 ... FR) is intended for usage with restricted power in at least one cell (C1) or sector (S1), characterized in, that
the mobile terminal comprises means for performing power or strength measurements of pilot symbols of its serving cell and of neighbor cells over a representative time interval,
the mobile terminal comprises means for calculating the signal to interference ratio in case of no interference coordination and in case of interference coordination leading to removal of the strongest interferer based on said power or strength measurements,
and the mobile terminal comprises means for sending the signal to interference ratios to a base station,
a resource distribution device whereby at least one of said at least two subsets (F1, F2 ... FR) is intended for usage with restricted power in at least one cell (C1) or sector (S1), characterized in, that
the resource distribution device comprises means for calculating the mean data throughput in case of no interference coordination and in case of interference coordination leading to removal of the strongest interferer based on difference in resource restrictions in neighboring cells or sectors by means of the signal to interference ratios in the cells measured by mobile terminals (T1),
and the resource distribution device comprises means for choosing at least one dedicated subset of said at least two subsets (F1, F2 ... FR) for usage with restricted power in at least one dedicated cell (C1) or sectors (S1) in such a way that the overall data throughput in the cells (C1, C2, ...) is improved or is maximized and a mobile network.

The main idea of the invention is that an automatic distribution of resource restrictions is made by a network entity and is based on power measurements by real mobile terminals in the mobile network reported over a representative time interval, as e.g. 1 day, and in that, by means of the measurements or correspondingly calculated improvement potentials for the case of interference coordination, the distribution is performed. Therefore, the measurements are rated with respect to improvement potential from interference coordination.

So in a typical scenario first a cell could be added without having resource restrictions set up or with a coarse distribution of resource restrictions. The cell and the possible resource restrictions would then be made known to the neighbor base stations, i.e. its schedulers. Then, after power measurements during operation time, this automatic resource distribution process would take place resulting in an improved distribution of the resource restrictions.

BRIEF DESCRIPTION OF THE DRAWINGS

Further developments of the invention can be gathered from the dependent claims and the following description.

In the following the invention will be explained further making reference to the attached drawings.

Figure 1:
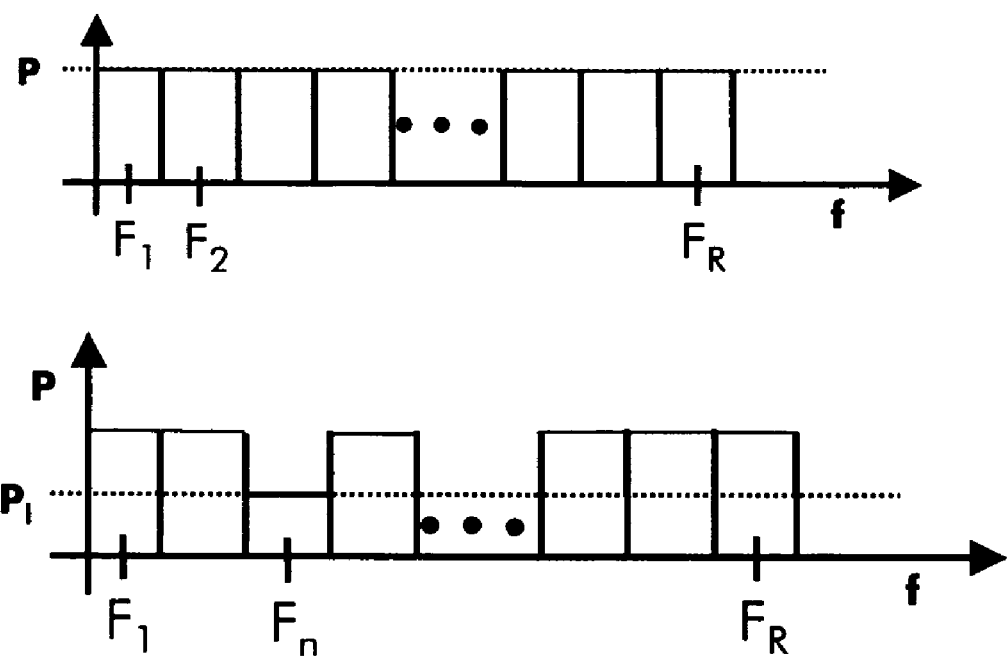
FIG. 1 schematically shows the partitioning of an OFDM or single carrier FDMA frequency band in disjunctive subsets and the power limitation of a restricted subset.

A mobile network according to the invention comprises mobile terminals, base stations and at least one resource distribution device.

Each of said mobile terminals is connected to one or multiple of said base stations, and the base stations are in turn connected via base station controllers to a core network. Each of said base stations is connected to at least one of said at least one resource distribution device The mobile terminals comprise the functionality of a mobile terminal for transmission and reception in a single frequency network as e.g. an OFDM network, i.e. they can be connected to a mobile network by means of a base station.

Furthermore, a mobile terminal according to the invention comprises means for performing power measurements of pilot symbols of its serving cell and of neighbor cells over a representative time interval, for calculating the signal to interference ratio in case of no interference coordination and in case of interference coordination leading to removal of the strongest interferer based on said power measurements and for sending the signal to interference ratio to a base station.

The base stations comprise the functionality of a base station of a single frequency network as e.g. a WLAN or an OFDM network, i.e. they provide the possibility for mobile terminals to get connected to the mobile network.

Furthermore, a base station according to the invention comprises means for calculating the signal to interference ratio in the cells in case of no interference coordination and in case of interference coordination leading to removal of the strongest interferer based on power measurements of pilot symbols performed by mobile terminals measuring the pilot symbols of their serving cells and of neighbor cells and for sending the signal to interference ratio to another network device.

A resource distribution device according to the invention comprises means for calculating the data throughput in case of no interference coordination and in case of interference coordination leading to removal of the strongest interferer by means of the signal to interference ratios in the cells measured by mobile terminals and for choosing at least one restricted subset for usage with restricted power in at least one dedicated cell in such a way that the overall data throughput in the cells is maximized.

In the following, by way of example the method according to the invention is described in detail making reference to FIGS. 1 to 6.

The method according to the invention is described for an OFDM transmission for UTRAN enhancement (UTRAN=Universal Mobile Telecommunication System Terrestrial Radio Access Network), but the invention could also be used e.g. for a single carrier system with cyclic prefix and frequency domain equalization or other FDMA system, where the different carriers are distributed to the mobile terminals.

In a single frequency network SFN, i.e. a system with frequency re-use of 1, the interference situation at the cell border stemming from the neighbor base station very much limits the achievable throughput at this cell border. In the inner circle of a cell the limitation is more by the bandwidth which justifies the SFN approach.

The invention is based on partitioning the frequency band into subsets. It is recognized that in an OFDM network, interference can be planned and avoided in contrast e.g. to CDMA networks (CDMA=Code Division Multiple Access) due to the carriers being eigenfunctions of the channel. This planning is also possible for an orthogonal uplink scheme. So it is possible to partition the frequency band or set of time-frequency patterns in a number of disjoint subsets which will interfere only little with each other. These subsets can correspond to time patterns if base stations were synchronized. If as usual this is not the case the subsets can correspond to frequency patterns. In general, these subsets can correspond to a number of time-frequency patterns each.

FIG. 1 shows in the upper part a number of R disjoint subsets F1 F2 . . . FR along the frequency axis f. All these subsets can have the same maximum power value along the power axis p, i.e. all subsets are used with the same maximum power. These subsets may contain frequency diverse frequency patterns to be robust against a frequency selective fading channel. For simplicity they are depicted as blocks over the frequency axis f as given in FIG. 1.

In a general case the subsets do not need to be disjoint albeit this makes the task more complex.

Now, a cell specific power planning is possible for these subsets. For example for the downlink depending on the dedicated cell a dedicated subset can only be used with a reduced power, i.e. a resource restriction, in the cell.

This power restriction is illustrated in the lower part of FIG. 1. Here, it can be seen that the restricted subset Fn can only be used maximally with the limited power pl.

Figure 2:
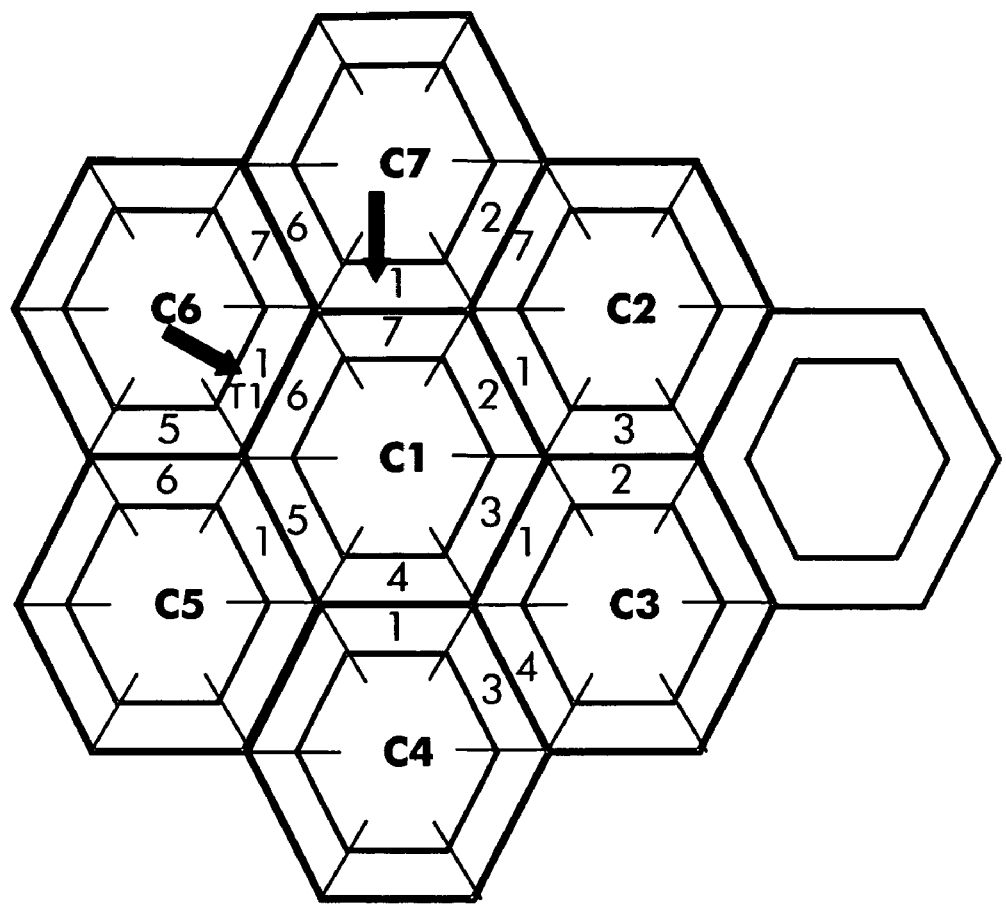
FIG. 2 schematically shows a hexagonal cell pattern with allocation of dedicated subsets to mobile terminals in border region.

The invention with interference power planning can be illustrated for omni-directional antennas and hexagonal cells as given in FIG. 2. for the case of R=7.

The cells are denoted Cn with the number n indicating the dedicated restricted subset Fn of the respective cell, and the subsets Fk that are used in the border regions of the cells are denoted with numbers k. In the inner area of the cells, all subsets are used for uplink. The respective dedicated restricted subset Fn is only used with limited power according to FIG. 1 in downlink. In downlink e.g. interference coordination works in such a way that the resource restriction in a neighboring cell turns in a preference for the mobile terminals served by the original cell and approaching the neighbor cell.

So the goal of the distribution of resource restrictions is that neighboring cells or sectors have different resource restrictions and the corresponding possible preferences for mobile terminals in the border region possibly leaving the cell are distributed across different parts of the border region so that as much as possible of the spectrum can be used in the whole border region and the data throughput is thus maximized.

By choosing R=7, it is achieved that a cell is surrounded by neighbors with a different cell number n, i.e. with a different dedicated restricted subset Fn.

Figure 3:
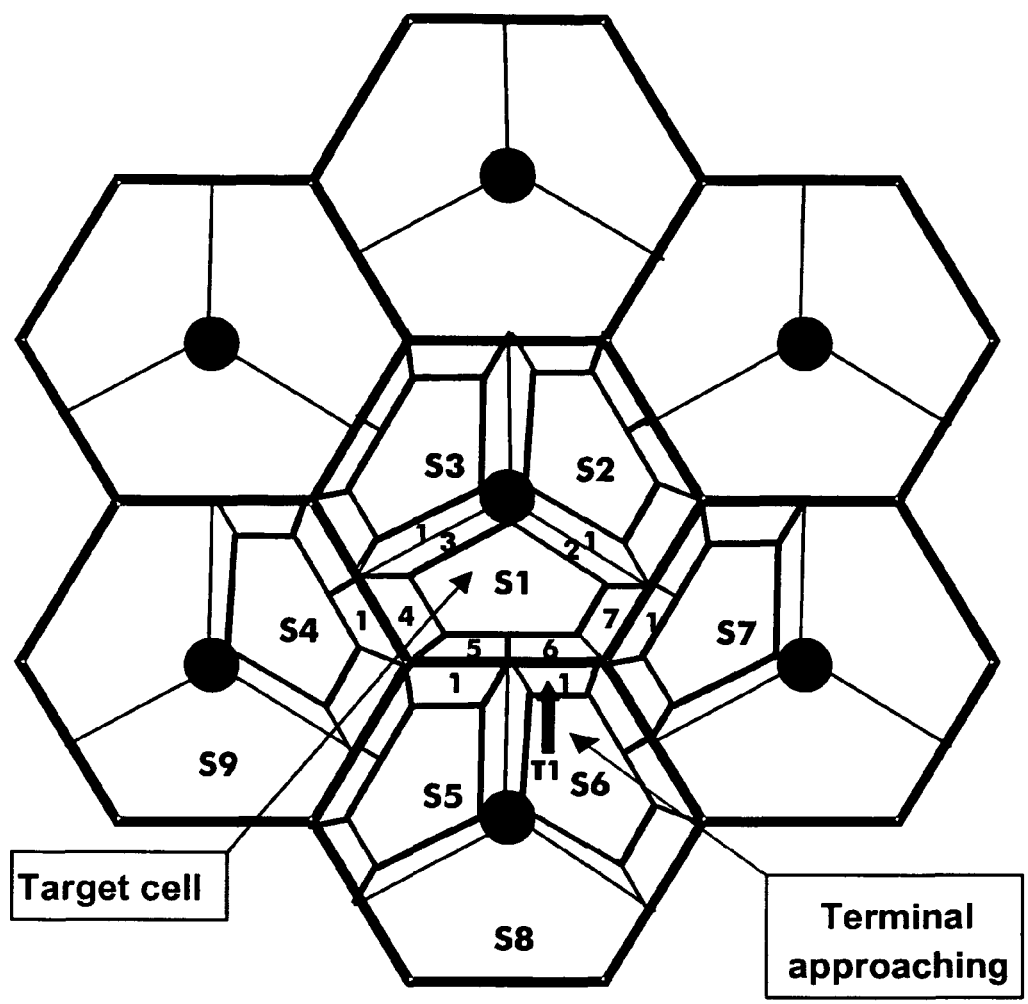
FIG. 3 schematically shows a sectorized cell pattern with allocation of dedicated subsets to mobile terminals in border region.

An analogue scenario is depicted in FIG. 3. Here, the interference power planning is illustrated for sectorized hexagonal cells for the exemplary case of R=9.

The sectors are denoted Sn with n indicating the dedicated restricted subset Fn of the respective sector, and the subsets Fk that are used in the border regions of the sectors are denoted with the number k. In the inner area of the sectors, all subsets are used for uplink but the respective dedicated restricted subset Fn is burdened more by interference and can only be used under observation of the strong inter-cell interference inside this inner area. The respective dedicated restricted subset Fn is only used with limited power according to FIG. 1.

Now in practice mobile networks have to be adapted to a real geography and limited availability of geographic locations where base stations can be placed. So the base station pattern will not be regular anymore. Thus a network planning for the resource restrictions or preferences has to be done for such real and irregularly positioned base stations. Further if a new base station is added in an area where other base stations are already placed the task is to distribute or redistribute the resource restrictions.

According to the invention, an automatic distribution of resource restrictions is made by a resource distribution device that is based on power measurements by real mobile terminals in the mobile network reported over a representative time interval, as e.g. 1 day, and in that, from the measurements or correspondingly calculated improvement potentials for the case of interference coordination the distribution is done. The measurements are rated with respect to improvement potential from interference coordination.

So in a typical scenario first a cell could be added without having resource restrictions set up or with a coarse distribution of resource restrictions. The cell and the possible resource restrictions would then be made known to the neighbor base stations, i.e. its schedulers. Then, after measurements during operation time, this automatic resource restriction distribution process would take place resulting in an improved distribution.

The restricted subsets of the frequency spectrum that are restricted in power inside each cell do not need to be disjunctive and the same calculation of data throughput improvement potential in the border region can be done regardless of the selection of basic units, i.e. frequency patterns that are the basic units for scheduling, the subsets consist of. The subsets are described by the selected frequency patterns and are one out of $2^n$ possibilities if n is the number of frequency patterns. This makes the distribution process numerically very complex. Thus the following explanation uses without loss of generality the assumption that only one out of R disjunctive subsets can be restricted in any cell or sector.

If a new cell has to be set up at a certain location, it will have M nearest neighbors maybe based on the Euclidean distance. The cells that are outside of the ring of neighbor cells will have no direct influence on the newly set up cell.

Figure 4:
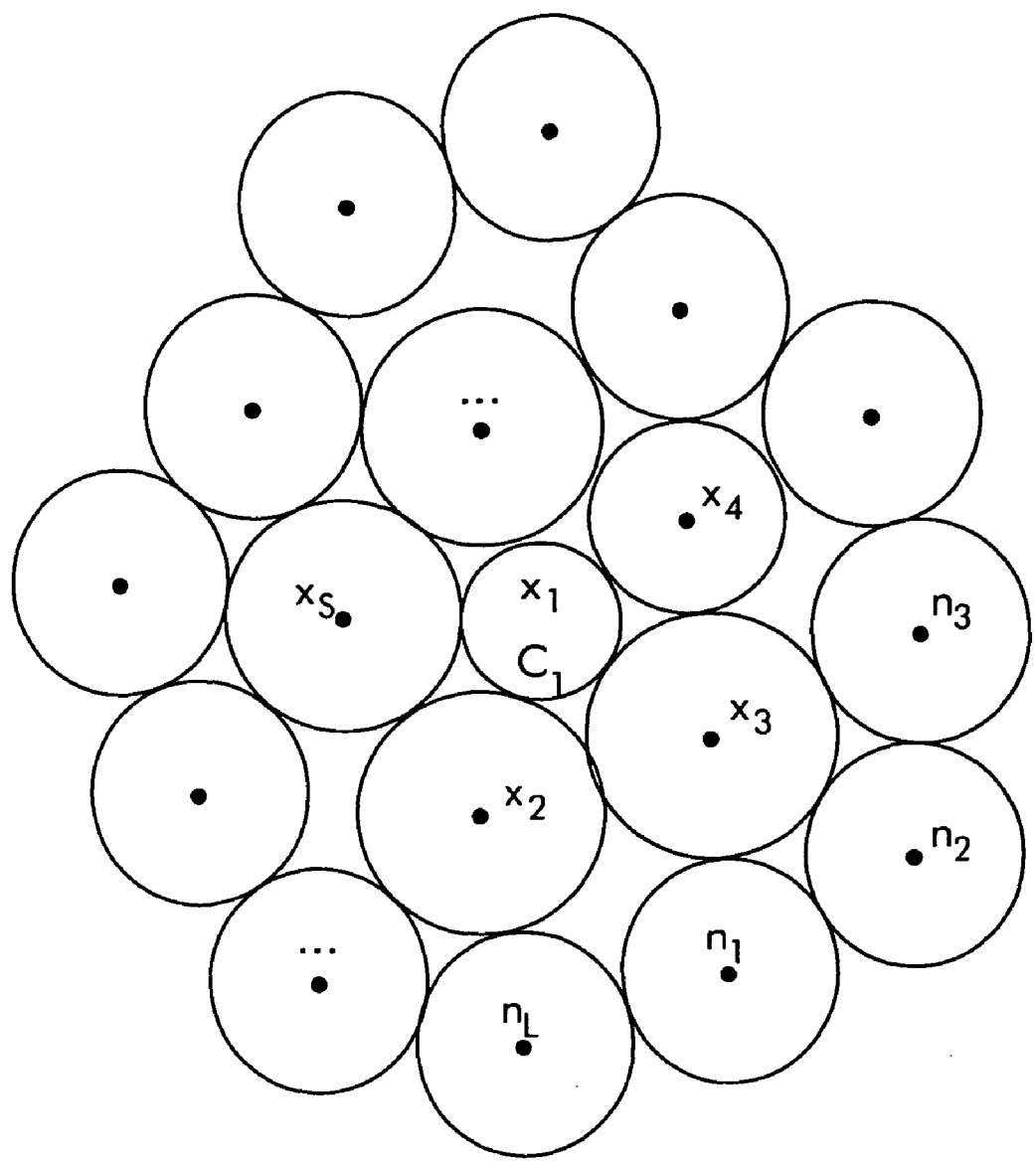
FIG. 4 schematically shows a newly set up cell $C_1$ surrounded by 5 nearest neighbors and a ring of outside cells.

In FIG. 4, a multiple of cells schematically depicted as circles is shown. A newly set up cell is denoted $C_1$ and said cell $C_1$ has 5 nearest neighbors. The indices of the restricted subsets that are restricted in power are denoted $x_i$ in each nearest neighbor cell. The cells belonging to the ring of cells adjacent to the nearest neighbors and having restricted subsets with the index $n_i$ do not directly influence the newly set up cell $C_1$.

The resource restriction distribution for the new cell $C_1$ could be optimized while keeping the setting of resource restrictions constant in the M nearest neighbors. This could be fast but too suboptimal. If all cells would be redistributed a theoretical optimum could be achieved but since not the whole network planning of e.g. thousands of cells should be revised by the set up of a new cell $C_1$, a sensible approach should be that the resource restriction setting in the cells in the ring outside of the ring of nearest neighbor cells is kept constant.

The invention is described further in the following for the general case.

The invention comprises that the experienced signal to interference ratio or data throughput by interference coordination is considered and maximized in the region of optimization by the chosen resource restriction distribution.

If we consider a specific cell or sector $C_i$ depending on the selected index $x_i$ for this cell, the subset $F_{x_i}$ is restricted in power. The data throughput gain that can be achieved by interference coordination depends on this selected index $x_i$ and the indices of the neighbor cells or sectors having the index $x_j$. If the restricted subsets of the cell $C_i$ and the neighboring cells are different, i.e. if $F_{x_i} \neq F_{x_j}$, a data throughput gain in the border region of the two cells can be realized by interference coordination. If a mobile terminal that is served by cell $C_i$ approaches the border to cell $C_j$, a data throughput gain inside $C_i$ is achieved if interference coordination is possible. Further if another mobile terminal is inside the neighbor cell $C_j$ and is served from there, then if the restricted subsets of the cell $C_i$ and the neighboring cells are different, i.e. if $F_{x_i} \neq F_{x_j}$, a data throughput gain in the border region of cell $C_j$ but outside cell $C_i$ is also achieved when this other mobile terminal approaches cell $C_i$ from the outside.

These data throughput gains can be calculated or approximated from the power measurements.

A mobile terminal inside cell $C_i$ measures the pilots from cell $C_i$ and thus the reception strength denoted by $\mathring{H}_i$, the strongest neighbor pilots from cell $C_j$ with strength $\mathring{H}_j$ and the second strongest pilots from cell k with $\mathring{H}_k$. Further worst case approximations can be made for the unspecific interference strength $I_{ges}$ from further cells given that the data power $|d|^2$ is given by $|d|^2 = \alpha |p|^2$ if $|p|^2$ is the pilot symbol power and $\alpha$ is a constant.

Then as shown in the following the signal to interference ratio for uncoordinated subsets and for subsets where due to interference coordination the strongest interferer is eliminated can be calculated or approximated.

For the different interference scenarios it will be shown how the gain in the signal to interference ratio is found or approximated.

Figure 5:
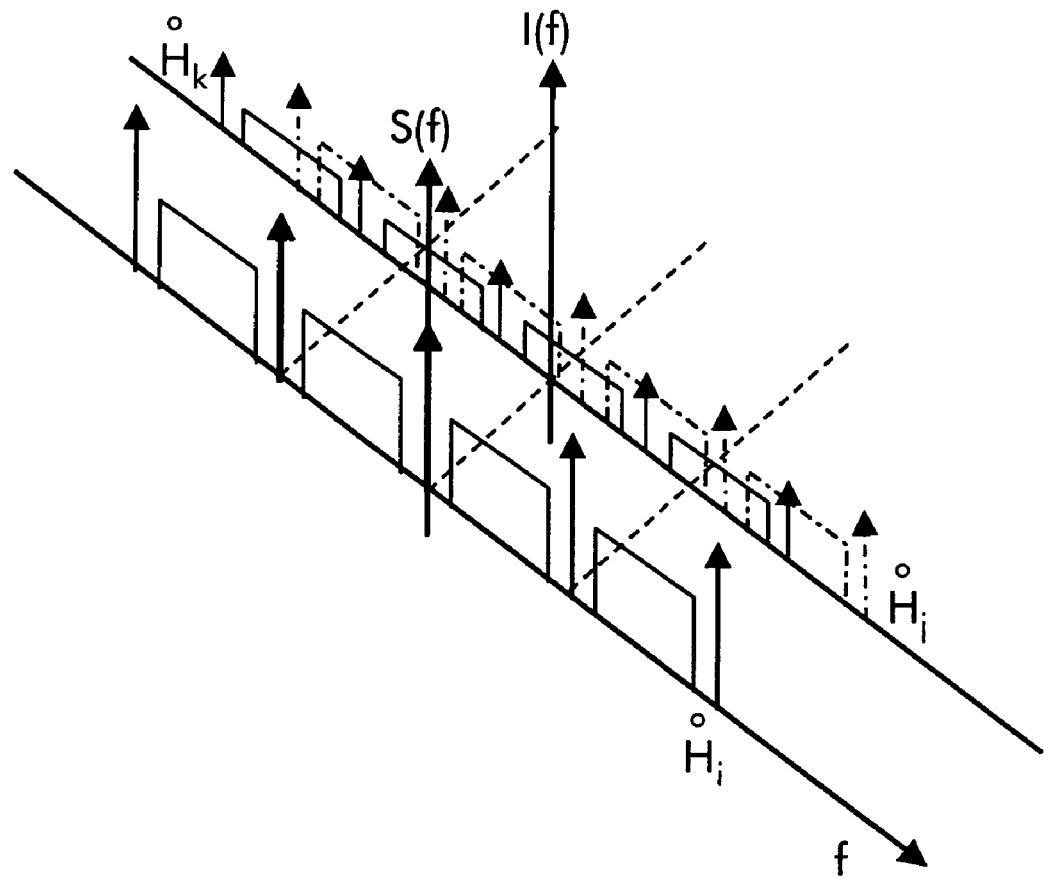
FIG. 5 schematically shows the interference situation at a cell border with two interferers showing the pilot and data interference powers schematically.

In FIG. 5 the possible interference situations are depicted. There, the signal and the interference are plotted against the frequency f. The arrows along the axis S(f) and I(f) symbolize pilots, and data are shown as rectangular signals. Along the axis S(f), the transmitted pilots and data from the serving base station of cell $C_i$ are depicted. Along the axis I(f), the transmitted pilots and data from two interfering cells $C_j$ and $C_k$ are depicted as dotted and solid arrows and rectangular signals respectively.

The signal to interference ratio $SIR_u$ in the uncoordinated case can in general be calculated to $$SIR_u \approx \frac{\left|\mathring{H}_i\right|^2}{\left|\mathring{H}_j\right|^2 + \left|\mathring{H}_k\right|^2 + I_{ges}}$$

Depending on the strength of interference three cases can be distinguished:

1. At the time of measurement the own pilots from the cell $C_i$ stick out but no other pilots from neighbor cells are measured above the power level of the own data from cell $C_i$. So the interfering data are also in amplitude much below the own data of cell $C_i$ but a lot of them are superposed. Interference coordination in that case does not work or will not bring a benefit. A measurement and reporting for certain cell indices is not possible and necessary.

2. At the time of measurement only the pilots from cell $C_j$ stand out against the data of cell $C_i$ but not the pilots from cell $C_k$. So Interference coordination would bring a lot, in theory a signal to interference ratio of infinity if only the interferer from cell $C_j$ and no other interferer would be present. But in practice it is known from practical cell layout scenarios that this is not possible. More than a gain in signal to interference ratio of 5 to 7 dB does not occur. So one makes the worst case assumption that the other interferers e.g. from cell $C_k$ with pilot power level $\mathring{H}_k$ lie with its pilot just below the data amplitude of cell $C_i$. So they shall lie not above, otherwise the pilots from cell $C_k$ would be measurable and the next case applies, but also not far below since this would be too idealistic. For the pilot to data ratio the equation $|d|^2 = \alpha|p|^2$ is given if $|p|^2$ is the pilot symbol power. Then $|\mathring{H}_k|^2 \approx \alpha|\mathring{H}_i|^2$ or $|\mathring{H}_k|^2 + I_{ges} \approx \alpha|\mathring{H}_i|^2$ can be assumed. $\mathring{H}_k$ is at least some decibels below $\mathring{H}_j$ otherwise the pilots from cell $C_k$ would also be measurable. So for the uncoordinated signal to interference ratio $SIR_u$ $$SIR_u \approx \frac{\left|\mathring{H}_i\right|^2}{\left|\mathring{H}_j\right|^2 + \alpha\left|\mathring{H}_i\right|^2} \text{ or } SIR_u \approx \frac{\left|\mathring{H}_i\right|^2}{\left|\mathring{H}_j\right|^2} \text{ can be assumed.}$$

For the coordinated signal to interference ratio $SIR_c$ with the worst case assumption the signal to interference ratio $SIR_c$ is limited to $$SIR_c \approx \frac{\left|\overset{\circ}{H}_i\right|^2}{\alpha\left|\overset{\circ}{H}_i\right|^2}$$

So the signal to interference ratio $SIR_c$ and possible data throughputs can be calculated and reported.

3. At the time of measurement the pilots from the interfering cells $C_j$ and $C_k$ stick out against the data of cell $C_i$. Interference coordination yields that the strongest interferer from cell $C_j$ is taken away. The unspecific interference $I_{ges}$ can be neglected against the interference from cell $C_k$, otherwise we would see a fourth pilot, or it can be assumed to be approximately with its pilot level on the data level from cell $C_i$ and with its data level a factor $\alpha$ below the data level from cell $C_i$. So for the uncoordinated signal to interference ratio $SIR_u$ this means:

$$SIR_u \approx \frac{\left|\overset{\circ}{H}_i\right|^2}{\left|\overset{\circ}{H}_j\right|^2+\left|\overset{\circ}{H}_k\right|^2+\alpha\left|\overset{\circ}{H}_i\right|^2} \approx \frac{\left|\overset{\circ}{H}_i\right|^2}{\left|\overset{\circ}{H}_j\right|^2+\left|\overset{\circ}{H}_k\right|^2}$$

and for the coordinated signal to interference ratio $SIR_c$ $$SIR_c \approx \frac{\left|\overset{\circ}{H}_i\right|^2}{\left|\overset{\circ}{H}_k\right|^2+\alpha\left|\overset{\circ}{H}_i\right|^2} \approx \frac{\left|\overset{\circ}{H}_i\right|^2}{\left|\overset{\circ}{H}_k\right|^2}.$$

So in the right case of neglecting unspecific interference $I_{ges}$ the gain between the signal to interference ratios is $$\frac{SIR_c}{SIR_u} \approx \frac{\left|\overset{\circ}{H}_j\right|^2+\left|\overset{\circ}{H}_k\right|^2}{\left|\overset{\circ}{H}_k\right|^2}.$$

Thus it is shown how for the possible situations the uncoordinated signal to interference ratio $SIR_u$ and the coordinated signal to interference ratio $SIR_c$ can be calculated from the available measurements. From this the data throughput values can be derived, e.g. by means of using simulation curves.

Thus, a potential data throughput for a mobile terminal in case of no interference coordination possibility $Th_u$ can be calculated or approximated and a potential higher data throughput for the mobile terminal denoted $Th_c$ can be calculated if the mobile terminal can benefit from interference coordination and can be scheduled on subsets that are restricted in power in the interfering cell.

So the data throughput is a function of the power measurement values that are reported from the mobile terminal to the base station, i.e. if interferers of a certain strength disturb the mobile terminal, it is $Th_u=f_u(\overset{\circ}{H}_i, \overset{\circ}{H}_j, \overset{\circ}{H}_k, I_{ges})$ and $TH_c=f_c(\overset{\circ}{H}_i, \overset{\circ}{H}_k, I_{ges})$. Thus the data throughput in case of no interference coordination $Th_u(t)$ and the data throughput in case of interference coordination $Th_c(t)$ can be calculated. So if interference from cell $C_j$ is measured at time t from a mobile terminal in cell $C_i$ the throughput gain $\Delta Th(t)$ is $\Delta Th(t)=Th_c(t)-Th_u(t)$ if the mobile terminal in cell $C_i$ is scheduled on the subset $F_{x_j}$ and not on other subsets.

In a similar way a calculation can be done for the uplink.

By summing over power measurements from multiple mobile terminals in cell $C_i$ and by integrating $\Delta Th(t)$ over the time of this interference periods or if a slowly changing process is in place by subsampling, multiplying with the sampling period $\Delta t$ and summing up, the mean data throughput gain $g_{i,j}$ from the combination of interference from cell $C_j$ with cell $C_i$ can be obtained and recorded. This should be done over a representative period of time.

The gain is only obtainable for unequal resource restrictions in the two cells $C_i$ and $C_j$. Thus the product $$|\text{sign}(x_i-x_j)|\cdot g_{i,j}$$

gives the achievable gain if due to cell planning or resource restriction distribution the indices of the restricted subsets that are used with restricted power in the cells $C_i$ and $C_j$ are set to $x_i$ and $x_j$ respectively. Only if $x_i \approx x_j$ this gain can be realized.

Now the outside data throughput gain from mobile terminals in cell $C_j$ measuring disturbance from cell $C_i$ can be calculated in a similar way. The power measurements of the mobile terminals in cell $C_j$ are used for determining the mean data throughput gain $g'_{i,j}$ analogue to the method for determining the mean data throughput gain $g'_{j,i}$.

Depending on the resource restriction distribution again the product $|\text{sign}(x_i-x_j)|\cdot g'_{j,i}$ gives the achievable data throughput gain due to resource restriction distribution.

In an embodiment of the invention, the mobile terminals determine the data throughput gain and report the data throughput gain via its serving base stations to an access server or a resource distribution device.

In another embodiment of the invention, the mobile terminals report the power measurements to its serving base stations which in turn determine the mean data throughput gain and report the mean data throughput gain to an access server or a resource distribution device.

In yet another embodiment of the invention, the mobile terminals report the power measurements to an access server or a resource distribution device via its serving base stations, and the access server or the resource distribution device determines the mean data throughput gain.

In total the data throughput gain on both sides for the combination of cell $C_j$ and cell $C_i$ is $$G_{i,j} = |\text{sign}(x_i-x_j)|\cdot \underline{\{g_{i,j}+g'_{j,i}\}}_{2gm_{i,j}}$$

Now to cover the whole multi-cell area a summation of these gains has to be done over all relevant border areas that are subject to the foreseen optimization.

Two cases can be highlighted here:

In the first case all nearest neighbors of the new cell $C_1$ shall keep their restricted subset index $x_j$. So referring to FIG. 4, the inner ring of nearest neighbors around the newly set up cell $C_1$ keeps their subset indices $x_j$ for $j=2,\ldots,M+1$.

In the second case more than one cell is optimized at the same time so e.g. referring to FIG. 4, only the outmost ring of outer cells keeps their restricted subset index $x_j$ for $j=S+1$, $S+2\ldots$, L and the restricted subset indices $x_1,\ldots,x_s$ are searched. The restricted subset indices that are kept fixed can also be denoted $n_j$ for $j=S+1, S+2\ldots, L$ to ease the distinction between the variables.

Figure 6:
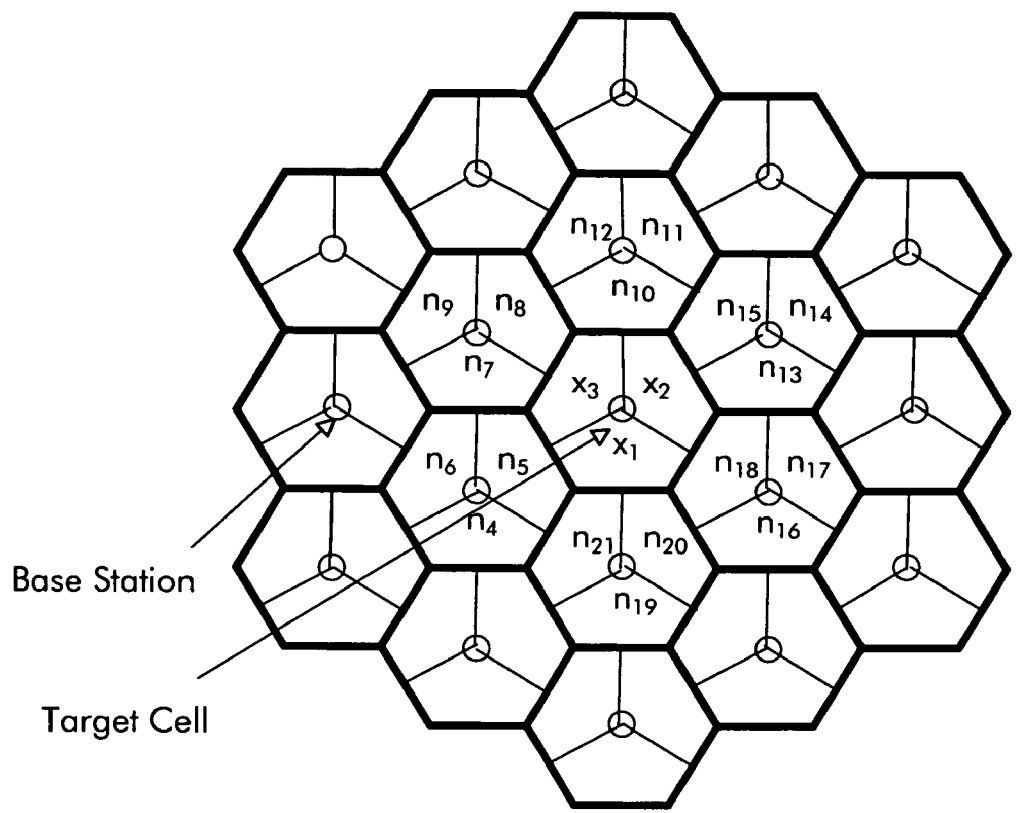
FIG. 6 schematically shows a cell layout with sectorized cells with cells having a fixed restricted subset with indices $n_i$ and cells for which a restricted subset denoted with indices $x_i$ is searched.

FIG. 6 shows a multitude of sectorized cells with a newly set up cell in the center. The three sectors of the newly set up cell have the restricted subsets that are restricted in power and that are searched denoted with the indices $x_1$, $x_2$ and $x_3$ respectively. The restricted subsets of the nearest neighbor cells are denoted $n_4, \ldots n_{21}$ and are all fixed, so that FIG. 6 represents the above mentioned first case.

Now to approach the first case $x_1$ is searched out of the index set $I_R=\{1,2,\ldots,R\}$ and the summation has only to be done over the borders to the M nearest neighbors. So the data throughput gain $G_{x_1}$ is given as $$G_{x_1} = \sum_{j=2}^{M+1} |\text{sign}(x_1 - x_j)| \cdot 2gm_{1,j}$$

If one sorts the given restricted subset indices $x_j$ according to the possible restriction numbers $v \in \{1,2,\ldots,R\}$ the set $I_v$ describes the restricted subset indices $x_j$ that have the value v. Then the sum can be reordered and split in two sums as $$G_{x_1} = \sum_{v=1}^{R} \left( |\text{sign}(x_1 - v)| \cdot \sum_{I_v} 2gm_{1,j} \right)$$

If there are indices v that are not used as restricted subset index on any of the considered cells the last sum can be empty and thus zero. It is hence optimal if $x_1$ is chosen to such a value v that was not used in the surrounding.

If there are no such values one remembers that the data throughput gains summed up are always positive but not all data throughput gains can be realized. An obvious optimum is thus found if the index $x_1$ is chosen so that the smallest of the positive data throughput gains is sacrificed. That is $x_1=v$ for which $$\sum_{I_v} 2gm_{1,j}$$

is minimum. In any case a solution can be easily given.

In the second case where more than one cell is optimized the summation has to be done over all relevant borders that are influenced by the setting of the searched variables $x_1, \ldots, x_s$. Excluding the borders between the fixed cells is a little complicated. For ease of notation the summation can also be carried out over all L considered cells even if this contains some fixed parts inside the outer ring that are not influenced by the searched variables.

The data throughput gain for the whole area is then given as $$G = \sum_{j=1}^{L} \sum_{j=1}^{L} |\text{sign}(x_i - x_j)| \cdot gm_{i,j}$$

The restricted subset indices that are kept fixed are denoted $n_{s+1}, \ldots, n_L$. In FIG. 6 it would be S=3. If one takes out the fixed cell border data throughput gains, the data throughput gain for the remaining influenced borders is then given as $$G_{ret} = \sum_{j=1}^{L} \sum_{j=1}^{L} |\text{sign}(x_i - x_j)| \cdot gm_{i,j} - \sum_{j=S+1}^{L} \sum_{j=S+1}^{L} |\text{sign}(n_i - n_j)| \cdot gm_{i,j}$$

Because it is $gm_{i,j}=gm_{j,i}$ the operation above for the data throughput gain of the whole area with L cells can be symbolized by the following operation using a symmetric matrix that contains the border gains. The notation shall symbolize that where the variables meet at the crosspoints the border gain is taken if the variables $x_i$, $x_j$ or $n_j$ have different values.

So the data throughput G is given as:

$$G = (x_1, x_2, \ldots, x_S, n_{S+1}, \ldots, n_L) \cdot$$

$$\begin{pmatrix} 0 & gm_{1,2} & \cdots & gm_{1,S} & gm_{1,S+1} & \cdots & gm_{1,L} \\ gm_{2,j} & 0 & & gm_{2,S} & gm_{2,S+1} & & gm_{2,L} \\ \vdots & & \ddots & & & & \vdots \\ gm_{S,j} & gm_{S,2} & & 0 & gm_{S,S+1} & & gm_{S,L} \\ gm_{S+1,j} & gm_{S+1,2} & & gm_{S+1,S} & 0 & & gm_{S+1,L} \\ \vdots & & & & & \ddots & \vdots \\ gm_{L,j} & gm_{L,2} & \cdots & gm_{L,S} & gm_{L,S+1} & \cdots & 0 \end{pmatrix} \begin{pmatrix} x_1 \\ x_2 \\ \vdots \\ x_S \\ n_{S+1} \\ \vdots \\ n_L \end{pmatrix}$$

The gain in the lower right square with indices of a value of S and above would then be taken out if one wants to take out the fixed cell border gains.

In this second case now, a solution to maximize the total gain G is more complex and intelligent search algorithms need to be considered.

A full search will always provide a solution. In the case of FIG. 6 for example if the inner cell and the inner tier has to be optimized only the outmost ring of 12 cells is fixed. Then the notation should be changed that all indices in the inner tier are also denoted $x_j$. So then 7 cells including their sectors have to be optimized.

If one assumes that there are 3 selectable sector settings with 3 possible rotations per cell only 9 possibilities do remain for each cell. A full search would then try through $9^7$ possibilities which is approximately $4.7 \cdot 10^6$. This is still feasible also with moderate processing power over a longer time frame.

In conclusion it has to be stated that a solution is possible in any case and this algorithm will be carried out by the network.

In a similar way also for the uplink the avoided interference can be calculated.

In a similar manner as described above the criterion could not consider the whole throughput but the minimum throughput at the cell edge. The distribution could be based on optimizing this criterion.

In any case as result the found resource restriction distribution will then optimize the network performance and is signaled to the concerned base stations. Further it is taken care that the neighbor base stations are also informed of the new setting.

By the given solution an addition of a new cell is possible without a manual resource distribution setting.

The given solution reaches an optimum resource distribution that is not based on the geometry but on real traffic distribution and terminal occurrences.

A low maintenance effort by the network provider is possible by this distribution carried out automatically in a network entity.

The optimization can be carried out more often than with a manual setting. The gain for a possible new setting can be compared to the current gain to decide if a reconfiguration pays off.

The invention claimed is:

1. A method for automatic resource restriction distribution for coordination of the interference between cells or sectors of a single frequency network with the frequency band being subdivided into at least two subsets whereby at least one of said at least two subsets is used with restricted power in at least one cell or sector, wherein each mobile terminal of a plurality of mobile terminals in the single frequency network performs power measurements of pilot symbols of its serving cell and of its neighbor cells over a representative time interval, based on said power measurements, the signal to interference ratio in the cells in case of no interference coordination and in case of interference coordination leading to removal of the strongest interferer is calculated, by means of the signal to interference ratios, the data throughput in the case of no interference coordination and in the case of interference coordination leading to removal of the strongest interferer is calculated, and at least one dedicated subset of said at least two subsets of the frequency band is chosen for usage with restricted power in at least one dedicated cell or sector of the single frequency network in such a way that the overall data throughput in the cells is maximized.

2. A method according to claim 1 wherein, if there is only one dedicated cell or sector for which the restricted subset should be chosen, the nearest neighbor cells or sectors of this dedicated cell or sector are subdivided into groups according to the subset that is used with restricted power in said nearest neighbor cells or sectors, the dedicated group of nearest neighbor cells or sectors with the lowest improvement of data throughput in the border region to this dedicated group of nearest neighbor cells or sectors in case of interference coordination based on differently selected confronting resource restrictions in the dedicated cell in case of removal of the interference from said dedicated group is determined, and the subset that is used with restricted power in said dedicated group of nearest neighbor cells or sectors is also used with restricted power in the dedicated cell or sector.

3. A method according to claim 1, wherein the dedicated cell is newly implemented in the single frequency network.

4. A method according to claim 1, wherein an outer tier of cells or sectors is kept constant in their resource restriction and only an inner group of cells or sectors is optimized in their resource restriction distribution.

5. A method according to claim 1, wherein cell resource restrictions are only selected from a reduced set of selectable sector settings.

6. A base station for automatic resource restriction distribution for coordination of the interference between cells or sectors of a single frequency network with the frequency band being subdivided into at least two subsets whereby at least one of said at least two subsets is used with restricted power in at least one cell or sector wherein the base station comprises means for calculating the signal to interference ratio in the cells or sectors served by the base station in case of no interference coordination and in case of interference coordination leading to removal of the strongest interferer based on power measurements of pilot symbols performed by mobile terminals within a cell formed by the base station, each mobile terminal measuring the pilot symbols of its serving cell and of its neighbor cells, and the base station comprises means for sending the calculated signal to interference ratio to another network device in conjunction with the choosing of the at least one cell or sector in the single frequency network and the at least one subset of the frequency band for which restricted power is used is performed by a resource distribution device; and means for determining the mean data throughput gain by interference coordination over a representative time interval for the cell served by the base station and for gathering the mean data throughput gains from other base stations or reporting the mean data throughput gain to the another network device.

7. The base station according to claim 6, wherein at least one dedicated subset of the at least two subsets is chosen for usage with restricted power in at least one dedicated cell or sector in such a way that the overall data throughput in the cells is maximized.

8. The base station according to claim 7, wherein, if there is only one dedicated cell or sector for which the restricted subset should be chosen, the nearest neighbor cells or sectors of this dedicated cell or sector are subdivided into groups according to the subset that is used with restricted power in the nearest neighbor cells or sectors, the dedicated group of nearest neighbor cells or sectors with the lowest improvement of data throughput in the border region to this dedicated group of nearest neighbor cells or sectors in case of interference coordination based on differently selected confronting resource restrictions in the dedicated cell in case of removal of the interference from the dedicated group is determined, and the subset that is used with restricted power in the dedicated group of nearest neighbor cells or sectors is also used with restricted power in the dedicated cell or sector.

9. A mobile network, comprising:
a plurality of base stations according to claim 6;
a plurality of mobile terminals; and
a resource distribution device in operative communication with the plurality of mobile terminals via the plurality of base stations, the resource distribution device including:
an automatic resource restriction distribution function for coordination of the interference between cells or sectors of a single frequency network with the frequency band being subdivided into at least two subsets whereby at least one of the at least two subsets is used with restricted power in at least one cell or sector;
wherein the plurality of base stations form the cells or sectors of the single frequency network, the plurality of mobile terminals are distributed among the cells or sectors, and the plurality of mobile terminals are served by the plurality of base stations in relation to the cell or sector serving the corresponding mobile terminal.

10. The base station according to claim 6, wherein an outer tier of cells or sectors is kept constant in their resource restriction and an inner group of cells or sectors is optimized in their resource restriction distribution.

11. A mobile terminal for automatic resource restriction distribution for coordination of the interference between cells or sectors of a single frequency network with the frequency band being subdivided into at least two subsets whereby at least one of said at least two subsets is used with restricted power in at least one cell or sector, wherein the mobile terminal comprises means for performing power measurements of pilot symbols of its serving cell and of its neighbor cells over a representative time interval, the mobile terminal comprises means for calculating the signal to interference ratio in case of no interference coordination and in case of interference coordination leading to removal of the strongest interferer based on said power measurements, and the mobile terminal comprises means for sending the calculated signal to interference ratio to its serving base station in conjunction with the choosing of the at least one cell or sector in the single frequency network and the at least one subset of the frequency band for which restricted power is used by a resource distribution device;

wherein at least one dedicated subset of the at least two subsets is chosen for usage with restricted power in at least one dedicated cell or sector in such a way that the overall data throughput in the cells is maximized.

12. The mobile terminal according to claim 11, wherein, if there is only one dedicated cell or sector for which the restricted subset should be chosen, the nearest neighbor cells or sectors of this dedicated cell or sector are subdivided into groups according to the subset that is used with restricted power in the nearest neighbor cells or sectors, the dedicated group of nearest neighbor cells or sectors with the lowest improvement of data throughput in the border region to this dedicated group of nearest neighbor cells or sectors in case of interference coordination based on differently selected confronting resource restrictions in the dedicated cell in case of removal of the interference from the dedicated group is determined, and the subset that is used with restricted power in the dedicated group of nearest neighbor cells or sectors is also used with restricted power in the dedicated cell or sector.

13. A mobile network comprising
a plurality of base stations;
a plurality of mobile terminals according to claim 11; and
a resource distribution device in operative communication with the plurality of mobile terminals via the plurality of base stations, the resource distribution device including:
an automatic resource restriction distribution function for coordination of the interference between cells or sectors of a single frequency network with the frequency band being subdivided into at least two subsets whereby at least one of the at least two subsets is used with restricted power in at least one cell or sector;
wherein the plurality of base stations form the cells or sectors of the single frequency network, the plurality of mobile terminals are distributed among the cells or sectors, and the plurality of mobile terminals are served by the plurality of base stations in relation to the cell or sector serving the corresponding mobile terminal.

14. The mobile terminal according to claim 11, wherein an outer tier of cells or sectors is kept constant in their resource restriction and an inner group of cells or sectors is optimized in their resource restriction distribution.

15. A resource distribution device for automatic resource restriction distribution for coordination of the interference between cells or sectors of a single frequency network with the frequency band being subdivided into at least two subsets whereby at least one of said at least two subsets is used with restricted power in at least one cell or sector, wherein the resource distribution device comprises means for calculating a mean data throughput for a single frequency network comprising cells formed by a plurality of base stations in case of no interference coordination and in case of interference coordination leading to removal of the strongest interferer, the calculated mean data throughput based on calculated signal to interference ratios for the cells in the case of no interference coordination and in the case of interference coordination leading to removal of the strongest interferer, the calculated signal to interference ratios based on power measurements of pilot symbols performed by a plurality of mobile terminals within the cells formed by the base stations, each mobile terminal measuring the pilot symbols of its serving cell and its neighbor cells, the mean data throughput taking into account the difference in resource restrictions in neighboring cells or sectors by means of the signal to interference ratios in the cells and the pilot symbols measured by the mobile terminals, and the resource distribution device comprises
means for choosing at least one dedicated subset of said at least two subsets for usage with restricted power in at least one dedicated cell or sector in such a way that the overall data throughput in the cells is maximized.

16. A mobile network comprising
a plurality of base stations,
a plurality of mobile terminals and
a resource distribution device according to claim 15 in operative communication with the plurality of mobile terminals via the plurality of base stations, said resource distribution device including
an automatic resource restriction distribution function for coordination of the interference between cells or sectors of a single frequency network with the frequency band being subdivided into at least two subsets whereby at least one of said at least two subsets is used with restricted power in at least one cell or sector;
wherein at least one base station or mobile terminal includes
means for calculating a signal to interference ratio in the cells or sectors served by the corresponding base station or serving the corresponding mobile terminal in case of no interference coordination and in case of interference coordination leading to removal of the strongest interferer based on power measurements of pilot symbols performed by mobile terminals within the cell formed by the corresponding base station or within which the corresponding mobile terminal is located, and, in relation to the power measurements, each mobile terminal measuring the pilot symbols of its serving cell and of its neighbor cells, and
means for sending the calculated signal to interference ratio to another network device in conjunction with the choosing of the at least one cell or sector in the single frequency network and the at least one subset of the frequency band for which restricted power is used by the resource distribution device.

17. The resource distribution device of claim 15, wherein, if there is only one dedicated cell or sector for which the restricted subset should be chosen, the nearest neighbor cells or sectors of this dedicated cell or sector are subdivided into groups according to the subset that is used with restricted power in said nearest neighbor cells or sectors, the dedicated group of nearest neighbor cells or sectors with the lowest improvement of data throughput in the border region to this dedicated group of nearest neighbor cells or sectors in case of interference coordination based on differently selected confronting resource restrictions in the dedicated cell in case of removal of the interference from the dedicated group is determined, and the subset that is used with restricted power in the dedicated group of nearest neighbor cells or sectors is also used with restricted power in the dedicated cell or sector.

18. The resource distribution device of claim 15, wherein an outer tier of cells or sectors is kept constant in their resource restriction and an inner group of cells or sectors is optimized in their resource restriction distribution.

* * * * *